(12) United States Patent
Tanaka et al.

(10) Patent No.: US 7,403,982 B2
(45) Date of Patent: Jul. 22, 2008

(54) NETWORK DEVICE AND NETWORK DEVICE CONTROL METHOD

(75) Inventors: Mayuko Tanaka, Yokohama (JP); Yoshimichi Kudo, Fujisawa (JP); Shigeto Oeda, Fujisawa (JP); Tadashi Kuwabara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 585 days.

(21) Appl. No.: 10/289,897

(22) Filed: Nov. 6, 2002

(65) Prior Publication Data

US 2003/0158956 A1    Aug. 21, 2003

(30) Foreign Application Priority Data

Feb. 15, 2002    (JP)    ............... 2002-037601

(51) Int. Cl.
  *G06F 15/177*    (2006.01)
  *G06F 15/16*    (2006.01)
  *G06F 15/173*    (2006.01)

(52) U.S. Cl. ............ 709/220; 709/218; 709/230; 709/244; 709/249

(58) Field of Classification Search ............ 709/218, 709/220, 230, 244, 249, 250; 399/8; 715/716; 700/86

See application file for complete search history.

(56) References Cited

U.S. PATENT DOCUMENTS

| | | | |
|---|---|---|---|
| 5,905,882 A * | 5/1999 | Sakagami et al. ............ | 700/86 |
| 6,850,252 B1 * | 2/2005 | Hoffberg ............ | 715/716 |
| 6,850,979 B1 * | 2/2005 | Saulpaugh et al. ......... | 709/225 |
| 6,862,594 B1 * | 3/2005 | Saulpaugh et al. ............ | 707/10 |

(Continued)

FOREIGN PATENT DOCUMENTS

JP    10-178438 A    6/1998

(Continued)

OTHER PUBLICATIONS

Nakajima et al. "A virtual Overlay Network for Integrating Home Applications", IEEE Proceedings of the 2002 Symposium on Applications and the Internet, pp. 246-255 (Jan. 2002).*

(Continued)

*Primary Examiner*—Saleh Najjar
*Assistant Examiner*—V. Korobov
(74) *Attorney, Agent, or Firm*—Townsend and Townsend and Crew LLP (57) ABSTRACT

An object of the present invention is to provide network devices and a network device control method which enable control network devices connected to an IP network, AV devices connected over 1394IF through gateway devices from the IP network, and home devices connected to ECHONET to be controlled without distinction among them. To achieve this object, a network device to serve as a controller comprises a controller application that detects a service of a target network device, using a message complying with an information exchange protocol common to the network, collects information such as an access method for the service, a function name, and parameters, and controls the network device upon request, and an information exchange protocol processing part that exchanges messages according to a protocol common to the network devices. The network device targeted for control comprises service that provides information for the controlling network device to perform control to the controller, and the information exchange protocol processing part.

8 Claims, 9 Drawing Sheets

U.S. PATENT DOCUMENTS

| | | | |
|---|---|---|---|
| 6,970,869 B1 * | 11/2005 | Slaughter et al. | 707/10 |
| 7,010,573 B1 * | 3/2006 | Saulpaugh et al. | 709/206 |
| 7,016,966 B1 * | 3/2006 | Saulpaugh et al. | 709/230 |
| 2002/0046239 A1 * | 4/2002 | Stawikowski et al. | 709/203 |
| 2003/0118353 A1 * | 6/2003 | Baller et al. | 399/8 |

FOREIGN PATENT DOCUMENTS

| | | |
|---|---|---|
| JP | 11-187061 | 7/1999 |
| JP | 2001-007861 A | 1/2001 |
| JP | 2001-223730 A | 8/2001 |
| KR | 1996-33059 A | 9/1996 |
| KR | 1997-68306 A | 10/1997 |

OTHER PUBLICATIONS

Saito et al., "Home Gateway Architecture and Its Implementation", IEEE Transactions on Consumer Electronics, vol. 46: 1161-1166 (Nov. 2000).*

Saito et al. "Home Gateway Architecture and Its Implementation," IEEE Transactions on Consumer Electronics 46:1161-1166 (Nov. 2000).

* cited by examiner

| SERVICE | | | | SERVICE INFORMATION |
|---|---|---|---|---|
| DEVICE CONTROL SERVICE (241) | | | | |
| | VTR CONTROL | | | VCR |
| | | URL | | //AV1/VCR/ |
| | | REPLAY | | |
| | | | METHOD NAME | Play |
| | | | PARAMETER | NONE |
| | | | RETURN VALUE | NONE |
| | | RECORD | | |
| | | | METHOD NAME | Record |
| | | | PARAMETER | NONE |
| | | | RETURN VALUE | NONE |
| | | : | | |
| | CAMERA CONTROL | | | CAMERA |
| | | URL | | //AV1/CAMERA/ |
| | | ZOOM | | |
| | | | METHOD NAME | Zoom |
| | | | PARAMETER | Ain (MAGNIFICATION) |
| | | | RETURN VALUE | Aout (SET MAGNIFICATION) |
| | | : | | |
| DEVICE INFORMATION PROVISION SERVICE (242) | | | | |
| | URL | | | //AV1/lookup |
| | DEVICE LIST ACQUISITION | | | |
| | | METHOD | | getDeviceList() |
| | | PARAMETER | | NONE |
| | | RETURN VALUE | | CAMERA |
| | DEVICE FUNCTION LIST ACQUISITION | | | |
| | | METHOD NAME | | getDevideFunction |
| | | PARAMETER | | DEVICE NAME (Camera) |
| | | RETURN VALUE | | VCR, CAMERA |
| | FUNCTION NAME ACQUISITION | | | |
| | | METHOD NAME | | getFunctionName |
| | | PARAMETER | | FUNCTION NAME (VCR etc) |
| | | RETURN VALUE | | Playt(), Record(), ... |

```
<target_list>
    <device>
        <device_name>stb</device_name>
        <target>tuner</target>
        <target>clock</target>
        <device_display_name>SET TOP BOX</ device_display_name>
    </device>
    <device>
        <device_name>tv</device_name>
        <target>tuner</target>
        <target>clock</target>
        <device_display_name>TELEVISION</ device_display_name>
    </device>
    <device>
        <device_name>vcr</device_name>
        <target>tape</target>
        <target>tuner</target>
        <target>clock</target>
        <device_display_name>VIDEOCASSETTE RECORDER</ device_display_name>
    </device>
</target_list>
```

FIG. 7

```
<function_list>
   <function>
      <function_name>getPowerState</function_name>
      <function_type> S(STATUS INQUIRY) </function_type>
      <parameter_name> powerState</parameter_name>
         <parameter_direction>out< /parameter_direction>
         <parameter_type>boolean< /parameter_type>
      </parameter_name>
   </function>
   <function>
      <function_name>setPowerState</function_name>
      <function_type> C(CONTROL) </function_type>
      <parameter_name> powerState</parameter_name>
         <parameter_direction>inout< /parameter_direction>
         <parameter_type>boolean< /parameter_type>
      </parameter_name>
   </function>
   <function>
      :
   <function>
      (REPEAT)
</ function_list>
```

FIG. 9

NETWORK DEVICE AND NETWORK DEVICE CONTROL METHOD

BACKGROUND OF THE INVENTION

1. Field of the Invention

The present invention relates to network devices and a method of controlling the network devices, and more particularly to network devices and a method of controlling them which are suitable for building a control system in which network devices connected to an identical network, and network devices connected to different networks through gateways coexist.

2. Description of the Prior Art

With widespread use of PC and broadband communication networks such as ADSL (Asymmetric Digital Subscriber Line), access to the Internet from home is further increasing. In AV devices, the HAVi standards are defined as a middleware for interoperability of devices connected through the IEEE1394 serial interface (hereinafter referred to as 1394IF), and AV/C (Audio Video Control) commands are defined. Also, the ECHONET standards are defined as network standards for so-called home appliances such as air conditioner and refrigerator. Furthermore, some AV devices and home appliances that are connectable with an IP network are emerging, and device scan be controlled through the Internet.

SUMMARY OF THE INVENTION

In the prior art, consideration has been given to only the control of devices connected to a same network, such as devices connected to an IP network, devices connected to 1394IF, or devices connected over ECHONET. Although bridge technologies such as IPover1394 enable access beyond platforms such as access from 1394IF to the IP network, they are technologies dedicated to specific platforms and have not been available for general use.

An object of the present invention is to provide network devices and a network device control method which enable control network devices connected to the IP network, AV devices connected over 1394IF through gateway devices from the IP network, and home appliances connected to ECHONET to be controlled without distinction among them. To achieve this object, a network device to serve as a controller comprises a controller application that detects a service of a target network device, using a message complying with an information exchange protocol common to the network, collects information such as an access method for the service, a function name, and parameters, and controls the network device upon requests of users and other applications, and an information exchange protocol processing part that exchanges messages according to a protocol common to the network devices. The network device targeted for control comprises target service that provides information (function name, parameter information, access URL, functions of network devices, etc.) for the controlling network device to perform control to the controller, and the information exchange protocol processing part.

BRIEF DESCRIPTION OF THE DRAWINGS

A preferred embodiment of the present invention will be described in detail based on the following, wherein.

DESCRIPTION OF THE PREFERRED EMBODIMENTS

Figure 1:
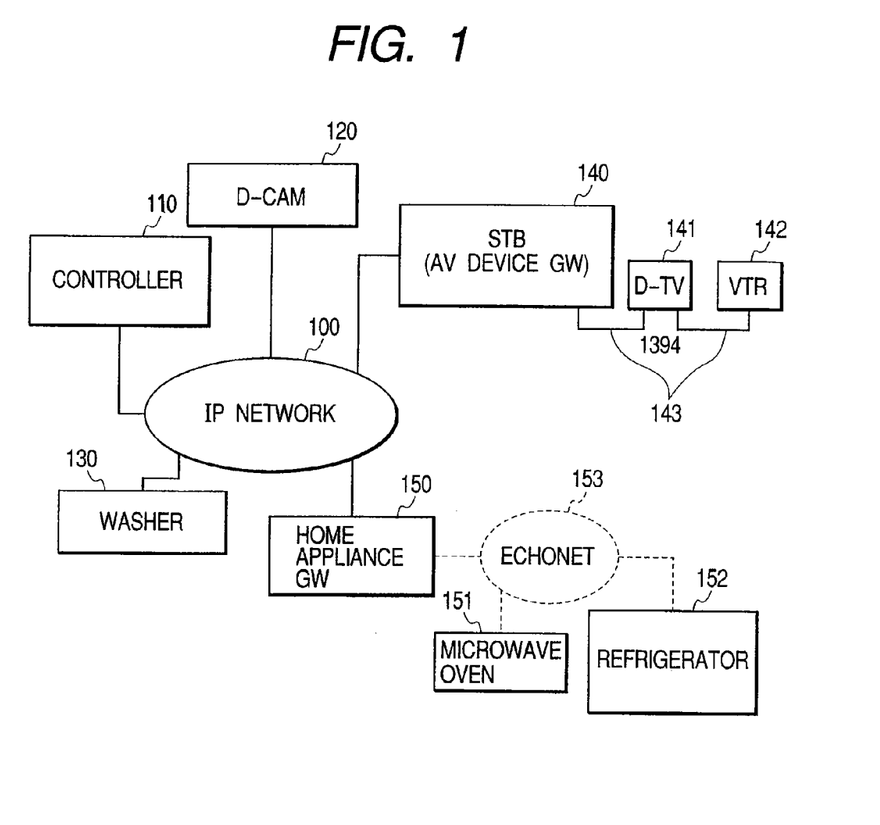
FIG. 1 is a drawing showing a network device control system configured with network devices according to an embodiment of the present invention.

Hereinafter, an embodiment of the present invention will be described in detail with reference to the accompanying drawings. FIG. 1 shows an example of a network device control system configured with network devices according to the embodiment of the present invention. The reference numeral 100 designates an IP network to which the network devices are connected; 110, a network device (hereinafter referred to as a controller) having the function of controlling other network devices connected to the IP network 100; 120, a digital camera (D-CAM) as an example of network devices of an AV system; and 130, a washer as an example of network devices of a home appliances system. An AV device gateway 140 (hereinafter referred to as an AV device GW) is a network device having gateway functions for networks of an AV device system and has the ability to control digital AV devices connected over 1394IF 143. A home appliance GW 150 is a network device having gateway functions for networks of a home appliance system and has the ability to control home appliances connected over ECHONET 153.

In this embodiment, the controller 110, the network devices (120, 130, 140, and 150) on the network, and the network devices (140, 150) having gateway functions include program modules that can operate in conjunction with each other by message exchange. The controller can obtain information required to control the network devices by message exchange, and can control the network devices, including the devices connected under control of the network devices having gateway functions by a common protocol.

Figure 2:
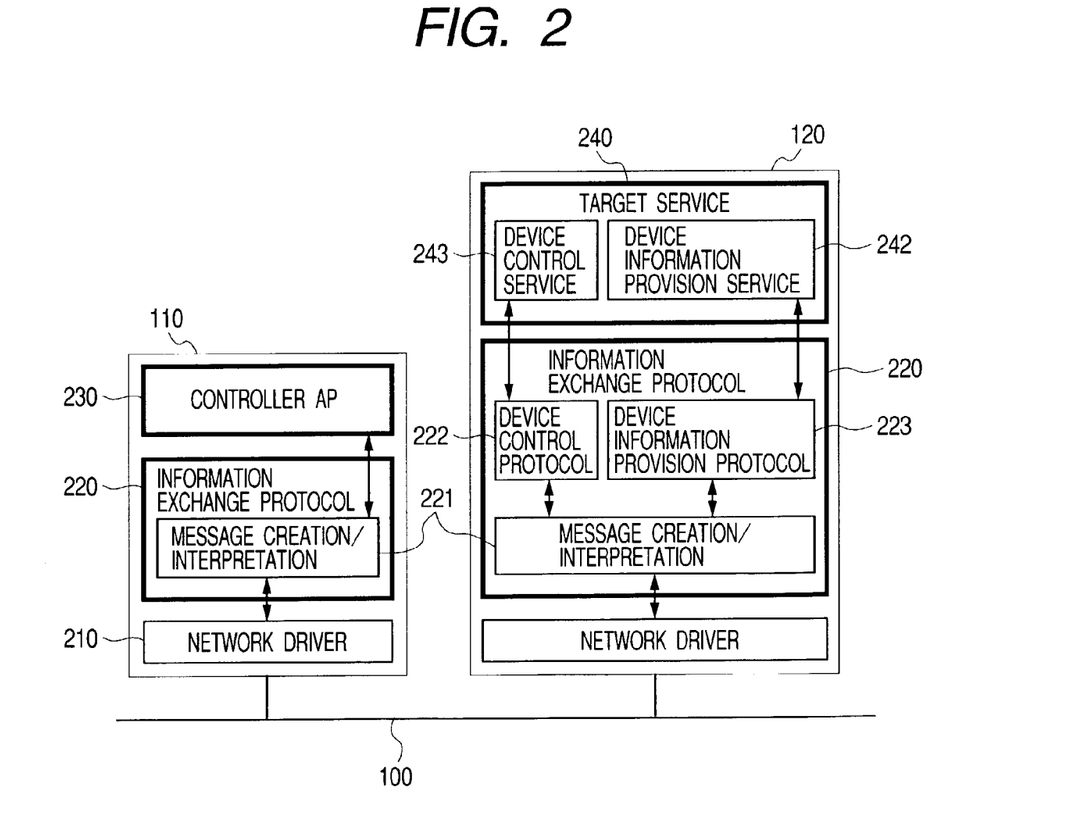
FIG. 2 is a drawing showing a software configuration of a controller and a network device according to an embodiment of the present invention.

Hereinafter, a description is made of a control method of the present invention and the configuration of the network devices with reference to the drawings. FIG. 2 shows a software configuration of the controller and the network devices according to the present invention. In the drawing, components that have the same function as those of FIG. 1 are identified by the same reference numbers and a description of them is omitted. The reference numeral 100 designates an IP network to which the network devices are connected; 110, a controller having a function for controlling the network devices; and 120, a digital camera (hereinafter referred to as a target device), one of the network devices controlled.

The controller 110 comprises: a controller application (hereinafter referred to as a controller AP) 230 for controlling the network devices; an information exchange protocol processing part 220 that exchanges messages according to a protocol common to the network devices, wherein the information exchange protocol processing part 220 comprises a message creation/interpretation part 221 that creates messages according to an information processing protocol in response to a request from the controller AP, and interprets a received message and passes it to the controller AP; and a network driver that sends and receives data to and from a network physical layer. The target device 120 comprises: a target service 240 that provides the controller with services for controlling the target device itself, wherein the target service 240 comprises an device control service 241 that provides a function invocation interface for controlling the target device itself, and controls the target device itself according to an invoked function, and a device information provision service 242 that provides a function invocation interface for providing information required to control the target device such as the functions of the target device, and provides requested information according to the invoked function; an information exchange protocol processing part 220 comprising a message creation/interpretation part 221 that interprets a received message, determines a protocol processing part to pass it to, distributes the message, receives a return value, and returns it to a message transmission source, an device control protocol processing part 222 that interprets a message received from the message creation/interpretation 221, presents parameters to a corresponding function, receives processing results, and returns them to the message creation/interpretation 221, and the device information provision protocol 223; and the network driver 210.

Figure 3:
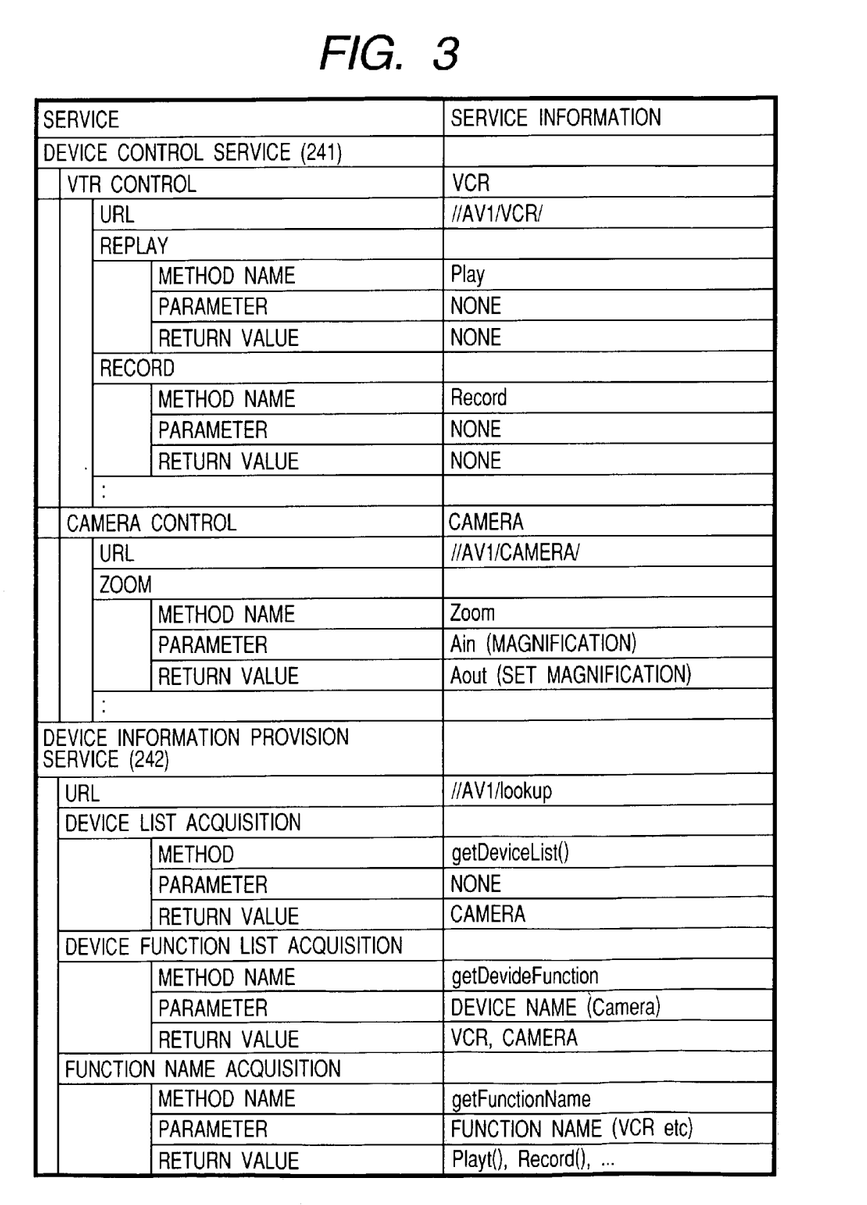
FIG. 3 is a drawing showing information of target service, provided to a controller by a target device according to an embodiment of the present invention.
Figure 4:
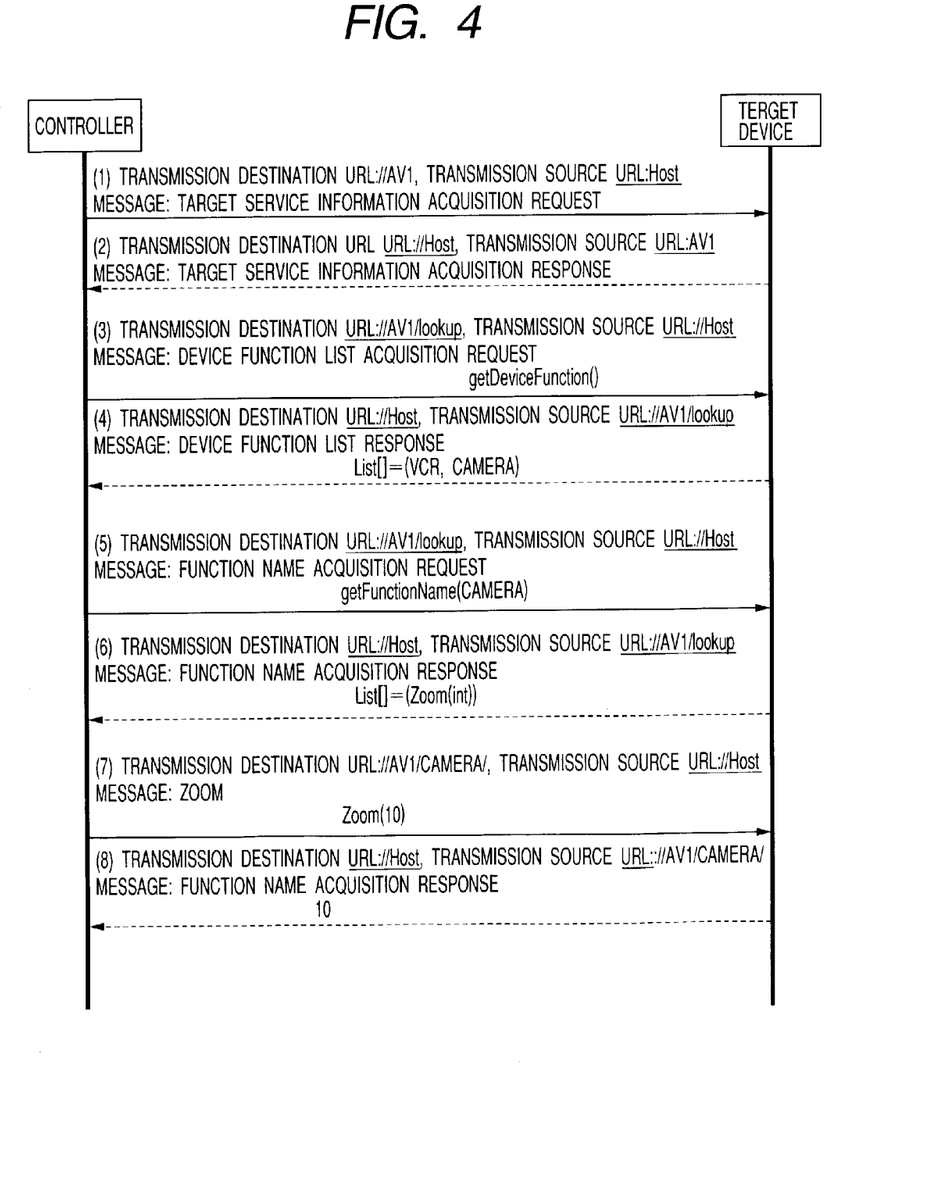
FIG. 4 is a drawing showing messages exchanged between the controller and the target device according to an embodiment of the present invention.

The behavior of the controller 110 and the target device 120 is described using FIGS. 3 and 4. FIG. 3 shows an example of information of the target service 240, provided to the controller 110 by the target device according to the embodiment of the present invention. FIG. 4 shows an example of messages exchanged between the controller 110 and the target device 120 when the controller 110 controls the zooming of the camera function of the target device.

Upon detecting the target device 120 on the network, the controller 110 transmits a message to the target device ((1) of FIG. 4) and obtains information of the target service 240 as exemplified in FIG. 3. As a possible method of the controller's detecting a desired target device, the controller transmits a multicast message of UDP (User Datagram Protocol) for inquiring about a target device having a desired function to the network, judges a network device responding to the inquiry as a target device, and obtains the IP address of a desired target device from the response message. However, the present invention imposes no limitation on a method of detecting a target device. FIG. 3 shows that the target device 120 has, as target services, device control service 241 having VCR control and camera control functions, and device information provision service 242, and shows information such as the names of individual functions, and parameters used and URLs for access. Upon obtaining format information such as service functions and access functions, provided by the target device, the controller transmits a message containing functions for controlling the target device according to user operations and requests from other applications to the access URL of the target device to control the target device. In an example of FIG. 4, the controller transmits an device list acquisition request ((3) of FIG. 4) and recognizes from a response that the target device 120 has a camera function and a VCR function. Further to obtain the function name of the camera function, the controller transmits a function name acquisition request with CAMERA as a parameter ((5) of FIG. 4) and obtains a zoom function Zoom. The controller transmits the zoom function Zoom with a parameter of zoom magnification 10 so that a zoom magnification of the target device 120 is set to 10×, and obtains the specified zoom magnification 10 as a return value.

As described above, the controller 110, by message exchange with the target device 120, obtains information such as the functions of the target device, URLs and function names for accessing the functions, and parameters, and controls the target device. Therefore, according to this method, since the controller does not need to know information for controlling the target device in advance and only a message exchange protocol and a data representation format have only to be shared between the controller and the target device, a network device control system can be built which is flexible enough to detect an increase or decrease in network devices and to distinguish between types of devices such as AV devices and home appliances.

As an example of application components constituting the controller AP 230 of the controller and the target service 240 of the target device, there is Web service accessible using various types of Internet-standard Web protocols. In the Web service, XML (Extensible Markup Language) format is used as a data representation format, and SOAP (Simple Object Access Protocol) is used for message exchange. To describe functions provided by the Web service, the language specifications of WSDL (Web Service Description Language), which is based on XML, are used. Although network control devices and a control method according to the present invention can be achieved by an original message protocol and data format, a system having higher versatility can be built by applying Internet-standard technologies.

Figure 5:
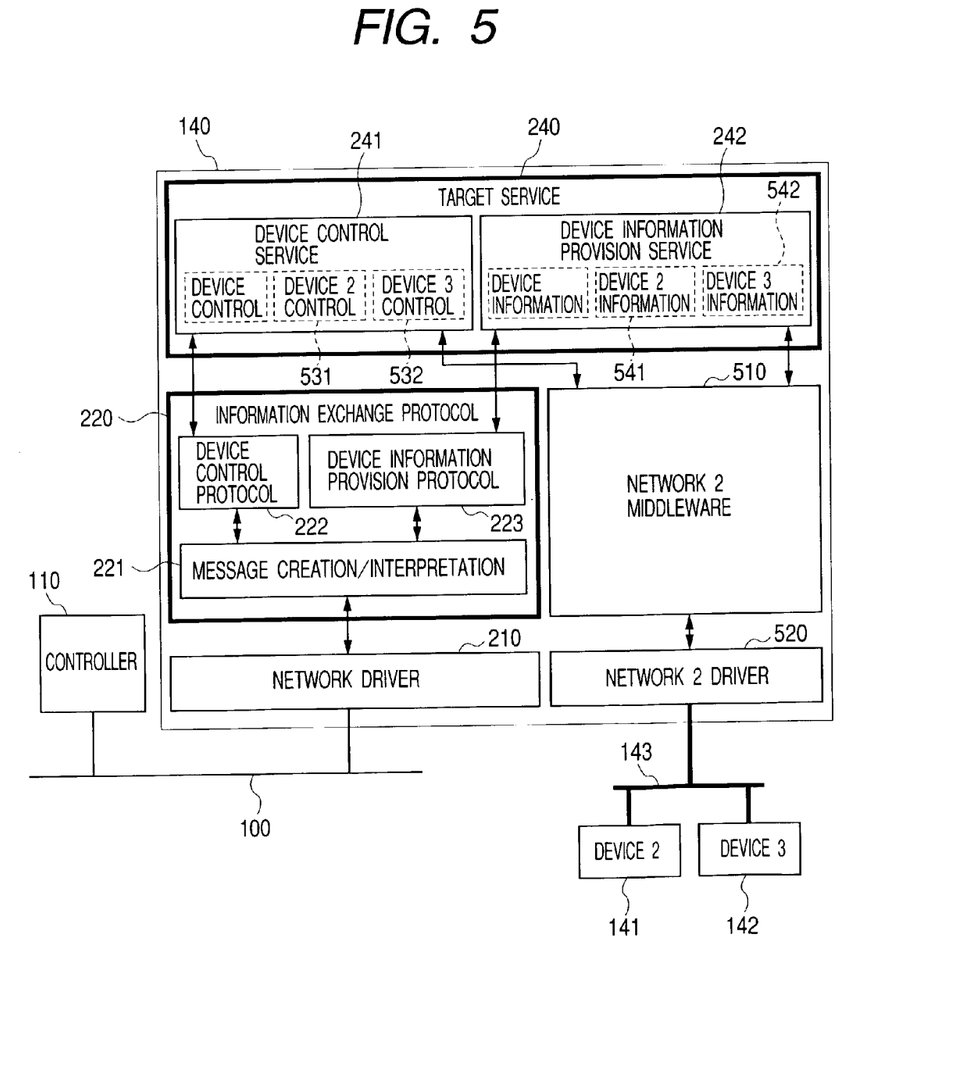
FIG. 5 is a drawing showing a software configuration of the controller according to an embodiment of the present invention and a network device having gateway functions.

FIG. 5 shows a software configuration of the controller according to an embodiment of the present invention and a network device having gateway functions. In the drawing, components having the same function are identified by the same reference numerals. The reference numeral 100 designates a controller, and 140 designates STB, which is one of network devices having GW functions controlled, hereinafter referred to as a target GW device. The functions of the controller are the same as those in FIG. 2; a description of them is omitted. The target GW device 140 comprises: a target service 240 that provides services for controlling the target device itself and devices under management of the gateway, wherein the target service 240 comprises a device control service 241 that provides an interface for controlling the target GW device itself and devices (141 and 142 in FIG. 1) under management of a gateway, and a device information service 242 that provides information required to control the target GW device itself and devices (141 and 142 in FIG. 1) under management of the gateway; an information exchange protocol processing part 220 comprising a message creation/interpretation part 221 that creates messages according to an information processing protocol and interprets a received message and passes it to a corresponding object, a device control protocol processing part 222 that accesses a corresponding device control service according to a control message received from the device control protocol processing 222, and a device information protocol processing part 223 that accesses a device information acquisition service according to an information request message received from the message creation/interpretation part 221, and acquires and returns device information; a network driver 210; a network 2 driver 520 that sends and receives data through devices under management of the gateway and a second network 143; and a network 2 middleware 510 used in the second network.

The target GW device detects an increase or decrease in devices connected to the second network, using the network 2 middleware 510. Using the functions of the network 2 middleware 510, the target GW device acquires or creates device 2 control 531 and device 3 control 532, which are applications for controlling devices under control of the gateway, from the device control service 241, and device 2 information 541 and device 3 information 542, which are applications for acquiring device information under control of the gateway, from the device information provision service 242.

Figure 6:
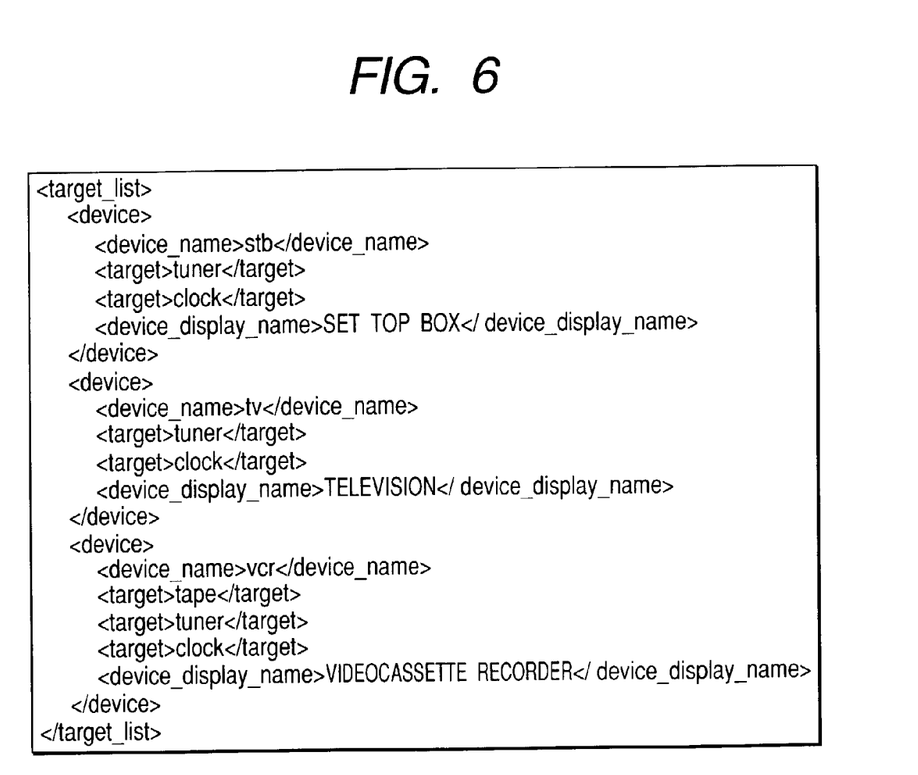
FIG. 6 is a drawing showing device list information of target services provided to the controller by the target device according to an embodiment of the present invention.
Figure 7:
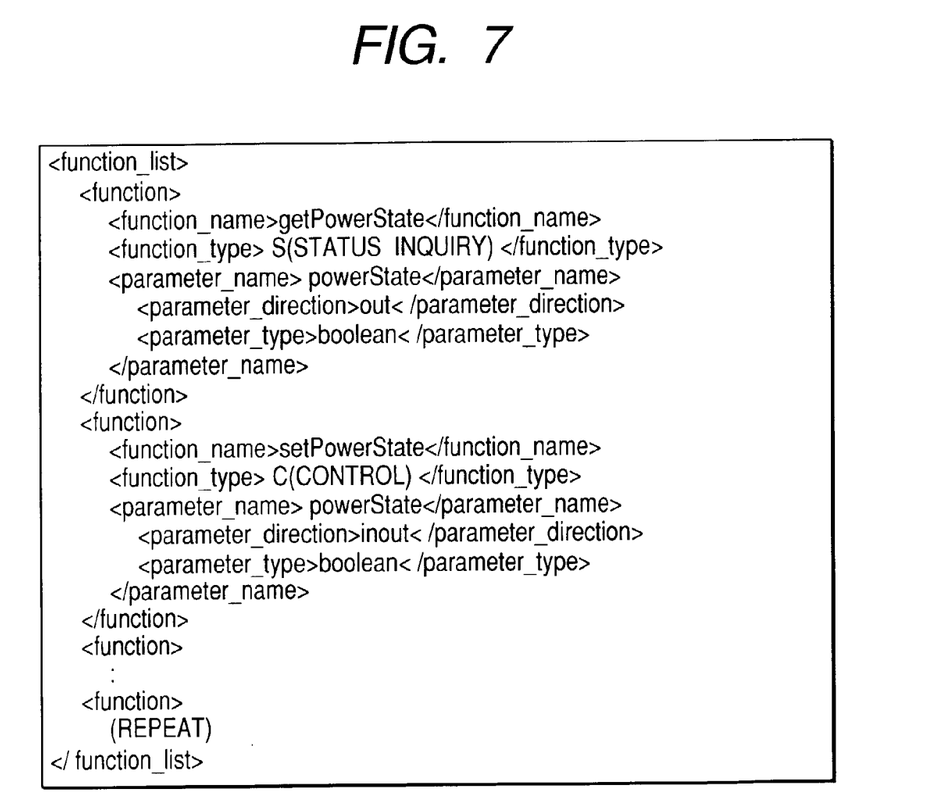
FIG. 7 is a drawing showing device function list information of target services provided to the controller by the target device according to an embodiment of the present invention.
Figure 8:
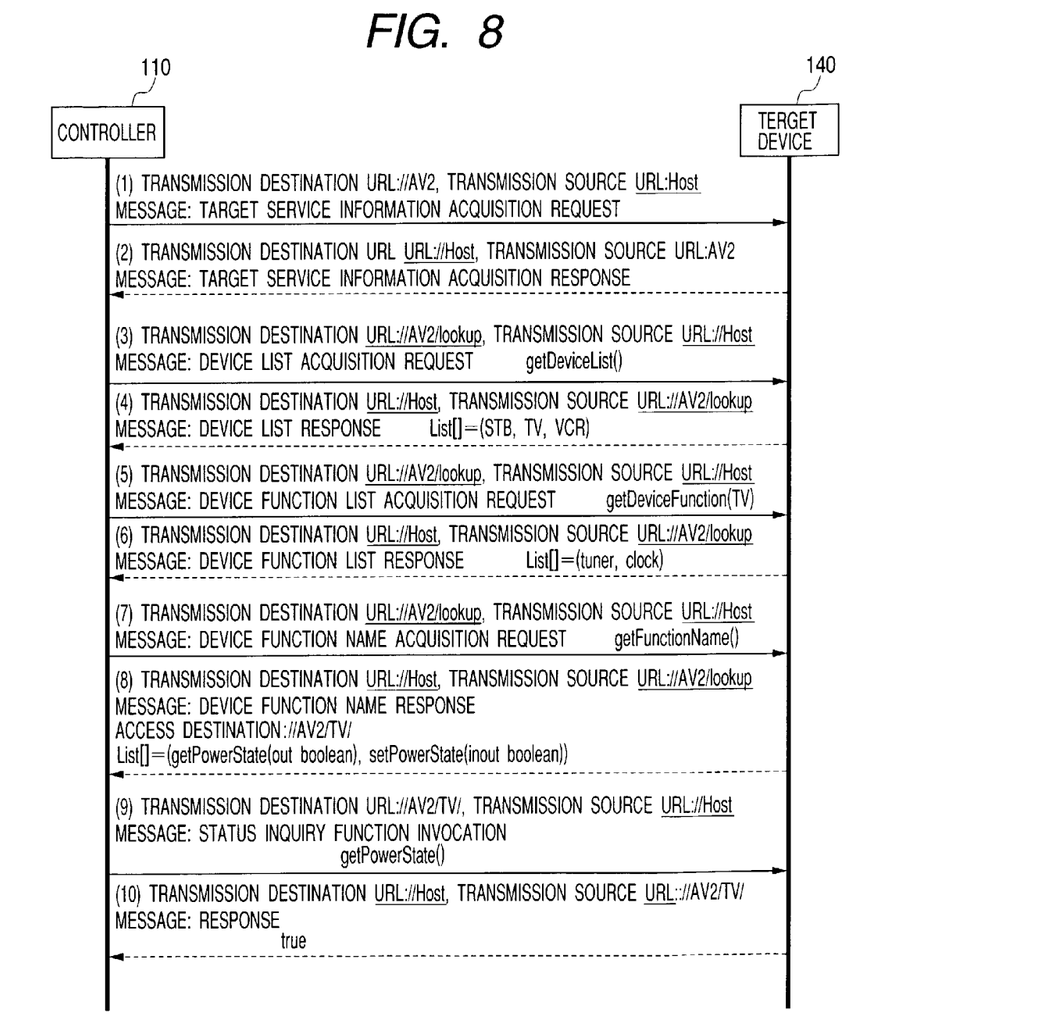
FIG. 8 is a drawing showing messages exchanged between the controller and the target device according to an embodiment of the present invention.

Referring to FIGS. 6, 7, and 8, a description is made of the procedure in which the controller according to one embodiment of the present invention collects information about a device to be controlled to control the device.

FIG. 6 shows an example of device list information, represented by an XML data structure. The device list information contains device information of the network device itself (140) and devices (141, 142) connected to the second network (143). In the drawing, the notation of an enclosure constituted of "<" and ">", referred to as a tag, denotes the meaning of described information. In this example, <target list> indicates a target device managed by the target GW device 140, <device> indicates isolating physical devices, <target> indicates an operable function of individual devices, <device name> indicates a name for identifying a device and <device display name> indicates a display name shown to users. The device list information comprises a combination of device information of the device 2 (141) and device 3 (142) connected to the second network (143), acquired or created using the device 2 information 541 and the device 3 information 542 by the device information provision service 240.

FIG. 7 shows an example of a device function list. In this embodiment, a device function list is provided for each of <target> tags of FIG. 6, and below <function list>, detailed information of each function is given under a <function > tag. As an example of detailed information of functions, there are provided <function name> to indicate a function name, <function type> to indicate whether the operation of the function is control or status inquiry, and <parameter name> to indicate the name of a parameter used, followed by detailed information of the parameter such as <parameter direction> to indicate whether the parameter is an input parameter, output parameter, or input output parameter, and <parameter type> to indicate the type of parameter. The device function list, like the device list information, is acquired or created and managed using the device 2 information 541 and the device 3 information 542 of the device 2 (141) and the device information provision service 240.

FIG. 8 shows a procedure in which the controller 110 obtains information of the target device 140 and operates a desired target function. Upon detecting the target device 140 on the network, the controller 110 transmits a message to the target device ((1) of FIG. 8), and as a response, obtains information for accessing the device information provision service. If the target device 140 discloses the device information provision service as Web service, the response is a WSDL address for using the device information provision service ((2) of FIG. 8). The controller obtains service provided by the device information provision service 242 and its interface information from WSDL. Service provided here is the same as that shown in FIG. 3 (242). The controller 110 transmits a device list acquisition request, using the device information provision service ((3) of FIG. 8). The device information provision service 242 of the target device refers to created device list information (FIG. 6), creates a device list, including information of devices connected to the second network, and returns a response ((4) of FIG. 8).

Next, to obtain the function of a desired device, the controller transmits a device function list acquisition request. In an example of FIG. 8, the controller requests a list of the functions of TV ((5) of FIG. 8). The device information provision service 242 refers to the device list information (FIG. 6) and includes a tuner function (tuner) and a clock function (clock) in the function list and returns the function list ((6) of FIG. 8). Furthermore, to obtain the names of desired functions, the controller transmits a function acquisition request ((7) of FIG. 8). In this example, with no parameters specified, the controller requests a list of functions related to overall operations of devices. The device information provision service 242 refers to the device function list (FIG. 7) and returns a list of functions on overall device operations and access destination information ((8) of FIG. 8).

The controller transmits ((9) of FIG. 8) getPowerState for consulting a power state to an access destination obtained in (8) of FIG. 8, and from a response, can recognize that the power to the TV is on ((10) of FIG. 8). The function getPowerState transmitted according to a protocol common to the first network is interpreted by the device control protocol 222 and passed to a corresponding control object device 2 control 531 of the device control service 241. The device 2 control converts the function into a protocol interpretable by the device 2 (141) and transmits the resulting function to the device 2 (141). A response from the device 2 (141) is received in the device 2 control 531 and converted into a protocol common to the first network, and passed to the controller through the information exchange protocol 220. That is, the controller can obtain information of devices connected to the second network following the same procedure as for devices connected to the first network to control the devices.

According to the present invention, since the target GW device 140 manages devices under control of the gateway, and manages device information and device control service in a format accessible from the controller, the controller can manage both network devices directly connected to the IP network and devices connected under control of the gateway, using a common method.

Figure 9:
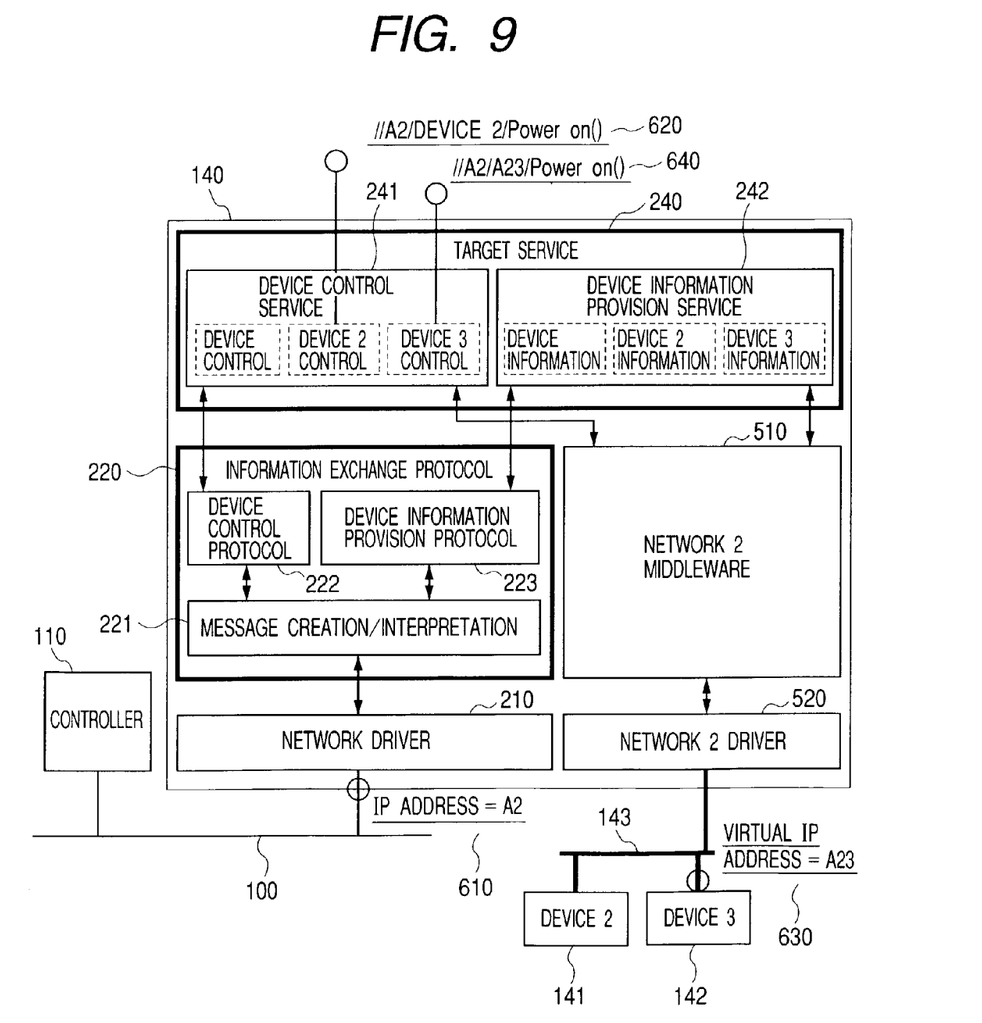
FIG. 9 is a drawing showing a configuration of access URLs of appliances managed by a target GW device according to an embodiment of the present invention.

Access URL of devices managed by the target GW device may, as shown in FIG. 9, take a form 620 that follows a directory structure from the IP address 610 of the target GW device, or a form (640) that sets a virtual IP address (630) in a device under control of the target GW device and makes invocation from the set virtual IP address.

As has been described above, according to the present invention, a target device, a target GW device having devices managed under it, and devices under control of the target GW device can be controlled under common services. As a result, network devices and a method of controlling the network devices can be provided which enable network devices connected to the IP network, AV devices connected over 1394IF through the gateway device from the IP network, home appliances connected to ECHONET to be controlled without distinction among them.

The invention claimed is:

1. A network device that has a first communication interface for connecting to a first network and a second communication interface for connecting to a second network, and has a network device control function for managing and controlling a target device connected to the second network, the network device comprising:
   a target service part comprising:
      a device information provision service part to provide device information; and
      a device control service part to manage and control the target device,
      wherein device information provision service cooperates with the network device control function to:

obtain the device information including a device name, function name, control kind, and parameter information for controlling from the target device;

convert the device information into a data format which a network controller connected to the first network can interpret;

generate access point information for device control with which the network controller can access the access point using a protocol to the first network; and provide along with the device information list information, function name, control kind, and the access point information according to a demand from the network controller, wherein the device control service part includes a device control part configured to:

convert a control function transmitted to the network controller into a command format known in the target device;

transmit the command to an object target device for operation in accordance with the access point information; and convert a response from the target device into a data format common in the first network and returns to the network controller; and an information exchange protocol processing part which generates and transmits messages in the message format common to the first network, interprets received messages generated in a message format common to the first network, and passes the messages to the target service part, wherein the target service part, by using a network device control function, detects at least one change in the number of target devices connected to the second network, generates the device information for at least one target device newly connected to the second network, and generates a device control part corresponding to each target device newly connected to the second network.

2. The network device according to claim 1, exchanging messages between the network devices to invoke functions provided by the network devices and obtain information owned by the network devices.

3. The network device according to claim 1, wherein information of messages exchanged between the network devices is described in XML (Extensible Markup Language) format.

4. The network device according to claim 1, wherein SOAP (Simple Object Access Protocol) is used for a communication protocol for information of messages exchanged between the network devices.

5. The network device according to claim 1, wherein functions and arguments of messages exchanged between the network devices are described using WSDL (Web Service Description Language).

6. The network device according to claim 1, wherein inquiry message transmission and response by multicast messages of UDP (User Datagram Protocol) are used to search for a network device capable of exchanging messages according to a message format common to the first network.

7. The network device according to claim 1, wherein function information owned by network devices connected to the second network, and control information constituted of information for controlling the network devices connected to the second network and control function invocation information are invoked by URL (Uniform Resource Locator) hierarchically formed by a name, function, and the like of the network devices connected to the second network with the IP address of the network device as a root.

8. The network device according to claim 1, wherein function information owned by network devices connected to the second network, and control information constituted of information for controlling the network devices connected to the second network and control function invocation information are invoked using IP addresses virtually assigned to the network devices connected to the second network by the network device.

* * * * *